(12) United States Patent
Karten

(10) Patent No.: US 6,421,662 B1
(45) Date of Patent: Jul. 16, 2002

(54) GENERATING AND IMPLEMENTING INDEXES BASED ON CRITERIA SET FORTH IN QUERIES

(75) Inventor: Johannes Karten, Harderwijk (NL)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/326,530

(22) Filed: Jun. 4, 1999

(51) Int. Cl.$^7$ ................................................ G06F 17/30
(52) U.S. Cl. ................................. 707/3; 707/2; 707/10
(58) Field of Search ........................ 707/3, 4, 10, 100, 707/101, 104; 706/46

(56) References Cited

U.S. PATENT DOCUMENTS

| | | | | |
|---|---|---|---|---|
| 5,581,664 A | * | 12/1996 | Allen et al. | 706/46 |
| 5,963,935 A | * | 10/1999 | Ozbutun et al. | 707/3 |
| 6,067,540 A | * | 5/2000 | Ozbutun et al. | 707/3 |
| 6,141,656 A | * | 10/2000 | Ozbutun et al. | 707/3 |

OTHER PUBLICATIONS (IEEE publication) The Microsoft Engine, by G. Graefe. Data Engin, 1996 pp. 160–161 (Mar. 1996).*
(IEEE publication) Range–bsed bitmap indexing for high cardinality attributes with skew, Kun–Lung WU, Computer Software and Appl. Conference, Aug. 1998, pp. 61–66.*
(IEEE publication) Encoded bitmap indexing for data warehouses by Ming–Chuan, WU, Data Engineering Conference 1998 (2–1998) pp. 220–230.*
(IEEE publication) Array–based evaluation of multi–dimensional queries by Y. Zhao et al. Data Engineering (1998), p. 241–249 (Feb. 1998).*

* cited by examiner

Primary Examiner—Diane Mizrahi
(74) Attorney, Agent, or Firm—Hickman Palermo Truong & Becker LLP; Brian D. Hickman; Carina M. Tan

(57) ABSTRACT

A method and apparatus are provided for retrieving data from a table in a database. According to the method one or more indexes are generated for use in processing a query by selecting values as unique key values from one or more columns in a table in a relational database system. Each unique key corresponds to a row in the table. The condition of whether a row in a table satisfies a search criterion, is represented by a bit in a bitstring or, in cases where the bitstring is segmented, in a segment of bitstring. The unique keys and corresponding segment of bitstring are then stored in an index.

26 Claims, 12 Drawing Sheets

Bitstring Segments for Table 100
Corresponding to 5 search criteria

GENERATING AND IMPLEMENTING INDEXES BASED ON CRITERIA SET FORTH IN QUERIES

FIELD OF THE INVENTION

The present invention relates to database management systems and more particularly to generating and implementing indexes based on criteria set forth in queries.

BACKGROUND OF THE INVENTION

Relational databases store information in indexed tables that are organized into rows and columns. Each row in the table represents an individual record. For example, a table that stores demographic records may contain columns that store: social security number, age, gender, marital status, number of children, income range, etc. Each row in the table stores the same column information for each individual identified by social security number. A user retrieves information from the tables by entering a request that is converted to queries by a database application, which then submits the queries to a database server. In response to the queries, the database server accesses the tables specified by the query to determine which information within the tables satisfies the queries. The information that satisfies the queries is then retrieved by the database server and transmitted to the database application and ultimately to the user.

For any given database server, the queries must conform to the rules of a particular query language. One popular query language is known as the Structured Query Language ("SQL"). SQL provides the user with the ability to generate complex queries that can be used to retrieve specific information from the tables.

In a typical database system, data is stored in a table in an unordered form. As records, i.e., rows are entered into a table, they are inserted into the next available location. Such a location can often be, relative to the location of the previous record, at a non-contiguous storage sector of a persistent storage device, such as a fixed disk drive or optical device. Over time, as records are added or dropped, the physical arrangement of the data in the persistent storage device usually does not correspond to the order, if any, of the rows in the table. The data for consecutive rows may appear to be randomly spread over a number of blocks in the persistent storage device. Consequently, it is not always possible to directly access or retrieve the record or range of records that satisfy a given set of search criteria. For example, in order to locate all rows in a table that have a given value in a column A, every row of the table must be fetched and column A of each row examined. Even when a row with the target value in column A is found, the remainder rows in the table must be fetched and column A examined, unless the values in column A are unique.

Another problem associated with data retrieval is that, typically, data for a particular row is stored in one or more units of contiguous blocks in a persistent storage device. A block is the smallest quantity of data that can be read from a persistent store into dynamic memory. If a database system requires any information stored in a particular block, the database system must read the entire block into memory. To retrieve values for a target column of a table, the database system must read the entire block or all the blocks that have any data from that column of the table, rather than reading only that portion of the block or blocks that contain values from the target column of the table. Since values for the target column may be present in all or almost all the blocks of a table, the entire table or significant portion thereof must be read into memory in order to retrieve the column values. In such a case, the database server, in response to a query, performs a "full table scan" by fetching every row of the table and examining the column or columns referenced in the search criteria specified in the query. This retrieval can be very costly because, if the amount of the data for the columns not used in the query is very large, then the fill table scan methodology becomes very inefficient due to the unnecessary amount of disk input/output.

Accordingly, in one approach to improving the efficiency of data retrieval, database systems provide indexes to increase the speed of the data retrieval process. A database index is conceptually similar to a normal index found at the end of a book, in that both kinds of indexes comprise an ordered list of information accompanied with the location of the information. Values in one or more columns of a table are stored in an index, which is maintained separately from the actual database table (the underlying base table). The ordered list of information in an index allows for quick scanning to find a target value or range of values. Moreover, since a conventional index stores only the values from one or more columns that serve as the key to the index, the amount of data being read into memory is significantly reduced as compared to a full table scan.

The above approach to improving the efficiency of data retrieval works well for simple queries, for example, queries that specify search criteria based on only one or two columns of a table. Such queries can be answered using a small number of indexes built on the appropriate columns. However, to process a complex query where the search criterion is a complex expression that involves values from many columns of a table, it may be necessary to maintain multiple indexes, one for each of the columns referenced in the query, or in the alternative, a large complicated index.

Referring to FIG. 1A, an exemplary Table 100, consisting of 100,000 rows, contains data on a set of individuals. The first column 102 in FIG. 1A is "Citizen ID" and contains unique key values. The Citizen ID numbers range from 0 to 99,999. Thus each row can be identified by its corresponding unique Citizen ID value. Apart from the unique key value column, the other columns are State 104, County 106, name 108, age 110, hair color 112, gender 114, marital status 116, number of offspring 118, and annual salary 120 indicators. In order to most efficiently process a query that specifies the search criteria of "all men over 30 years of age, with brown hair, who are married and who have 5 children", indexes would be maintained for the column values in the gender, age, hair color and number of children columns. The disadvantage of maintaining multiple indexes is that each time a row of data is added, deleted, or changed in the base table, the associated indexes have to be updated. The cost of maintenance of the indexes can become expensive. The alternative to maintaining multiple indexes that will satisfy the search criteria of a complex query, such as the example above, is to maintain a single complicated composite index built on the specific combination of columns referenced in the complex query. It is unlikely that a composite index will be built on the exact combination of columns that is targeted by a given query. Moreover, multiple composite indexes built on different combinations of columns in the table may have to be maintained in anticipation of the search criteria of a given query. Again, the cost of maintenance of such an index is significant.

There exists a need to process such a complex query more efficiently. There also exists a need for reducing the amount of data read from a persistent storage device when retrieving information from a table.

SUMMARY OF THE INVENTION

There is a need for improving the efficiency of retrieving values from a column or columns of a table in a database. There also exists a need for reducing the amount of data read from a persistent storage device when retrieving information from a table.

These and other needs are addressed by the present invention, which generates one or more indexes for use in processing a query by selecting values as unique keys from one or more columns in a table in a relational database system. Each key corresponds to a row in the table. The condition of whether a row in a table satisfies a search criterion, is represented by a bit in a bit sequence or bitstring. The unique keys and corresponding bitstring are then stored in an index.

Still other objects and advantages of the present invention will become readily apparent from the following detailed description, simply by way of illustration of the best mode contemplated of carrying out the invention. As will be realized, the invention is capable of other and different embodiments and its several details arc capable of modifications in various obvious respects, all without departing from the invention.

Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
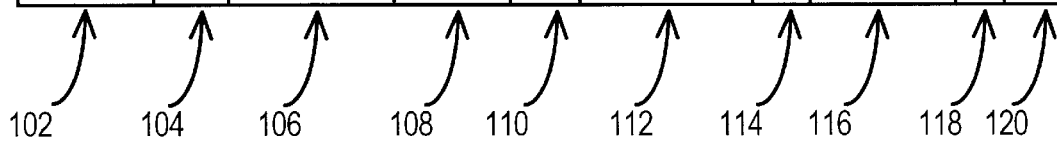
FIG. 1A is a table containing 100,000 rows of data.

A method and apparatus for generating and implementing indexes based on criteria set forth in queries is described. The criteria set forth in queries will henceforth be referred to as the "search criteria" of the queries. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

Queries select information by specifying search criteria. Frequently, the search criteria specified by queries is complex. The search criteria may consist, for example, of Boolean expressions, complex mathematical expressions, or constants. The Boolean expressions can involve values from man/columns.

According to one aspect of the invention, the computational expense involved in processing queries is reduced by pre-computing whether rows satisfy complex search criteria, when it can be anticipated that queries that specify the complex search criteria will be subsequently received. The results of the computation are then stored in an index for quick retrieval. When queries that specify that search criteria are received, rows that satisfy the criteria are retrieved based on the stored information, thus avoiding the need to evaluate each row at the time of query processing.

For example, assume that the search criterion of a query is "all married males over the age of 35 and earning an annual income in the range of 50,000 and 60,000 dollars". In addition, assume that the query with this search criteria is issued repeatedly within a particular database system. According to an embodiment of the invention, the preceding search criteria is pre-evaluated for each row of data. This pre-evaluation may be performed, for example, for each row at the time the row is inserted into Table 100 of FIG. 1A.

The condition of whether a row in a table satisfies the search criterion can be represented by a bit. According to one embodiment, a bit set to "1" indicates that the corresponding row satisfies the search criterion (i.e. evaluates to "true"). Similarly, when a row of data in a table does not satisfy the Boolean expression, the bit corresponding to the unique key value identifying that particular row of data is set to "0". Thus, the computed result of the search criterion for each row of data, known as the "status" of the row, is captured by a single bit.

The bits generated for the rows are then arranged in a bit sequence or bitstring, and stored in an index, as will be explained in greater detail below. An index that contains bitstrings generated in this manner is referred to herein as a row-status index.

Each bit in a bitstring corresponds to a row in the table and indicates whether the corresponding row satisfies the criterion associated with the bitstring. According to the embodiment, each row in the table is also identified by a unique key value. According to one aspect of the invention, a mechanism is provided for determining the unique key value that corresponds to a bit based on the position of the bit in the bitstring. Conversely, a mechanism is provided for determining which bit in a bitstring corresponds to a row based upon the unique key value of the row.

Once a row-status index has been established for a particular search criterion, whenever the conditions in a query match the search criteria, the search criteria need not be re-computed to process the query because the results of the computation have been stored in the row-status index built on that particular search criteria. The row-status index can efficiently indicate which rows in the table satisfy the search criteria by returning a set of unique key values that identify those rows in the table whose bitstring bits indicate that they satisfy the search criteria.

For example, with reference to Table 100 of FIG. 1A, for the search criteria of "all married males over the age of 35 and earning an annual income in the range of 50,000 and 60,000 dollars", a search using the row-status index built on the same search criteria will return the set of unique key values, <2, 4, ..., 106, ... 99,999>. The unique key values in this set identify the rows in the table that satisfy the above search criteria.

Often, the set of unique key values that are returned by the row-status index is the very information targeted by the query. In the above example, the set of unique key values, <2, 4, ..., 106, ... 99,999> could be all the information that is needed. For example, suppose the goal is to find Citizen IDs of all persons who fit the above search criteria in order to analyze consumption behavior of such persons. By accessing the row-status index, it may be determined that Citizen IDs 2, 4, ..., 106, ... 99,999 respectively identify the persons who fit the search criteria. The table itself need not be accessed to satisfy the query. Once these persons have been identified, further studies may be made regarding their consumption habits by submitting subsequent queries.

When the targeted information is more than the unique key values, the set of unique key values can be used to obtain additional information. For example, a query can select data from multiple tables using the set of unique keys in a "join" operation. A join is a query that combines rows from two or more tables, views, or snapshots. A join is performed whenever multiple tables appear in a query's FROM clause. Rows from these tables are paired using the join condition specified in the query's WHERE clause. Thus, the join condition, "WHERE Citizen ID=ANY (2, 4, ... 106, ... 99,999)" can be used to return rows from all the tables in the query's FROM clause that match this join condition. The tables in the FROM clause of the query are tables which contain additional information on the persons identified by Citizen IDs, 2, 4, ... 106, ... 99,999 respectively.

Furthermore, according to the embodiment, the row status index is not updated in response to all updates to rows. The index is updated in response to updates to a row only if the updates to the row cause a change in the status of the row. For example, if the row, despite the update, continues to satisfy the search criterion, then the index need not be updated. However, if the row, after the update, does not continue to satisfy the search criterion, then the index needs to be updated. For example, assume that the search criterion of a query is "all married males over the age of 35 and earning an annual income in the range of 50,000 and 60,000 dollars." If the third row in Table 100 of FIG. 1A is updated from 55K to 57K in column 120, then the index need not be updated because the row continues to satisfy the search criterion, "all married males over the age of 35 and earning an annual income in the range of 50,000 and 60,000 dollars." However, if the third row in Table 100 of FIG. 1A is updated from 55K to 65K in column 120, then the index needs to be updated because the row no longer satisfies the search criterion, "all married males over the age of 35 and earning an annual income in the range of 50,000 and 60,000 dollars."

GENERATING A ROW-STATUS BITSTRING

Generating an index that reflects the "status" of rows in a table (i.e. whether the rows satisfy a particular search criteria) is founded on the premise that a particular search criteria will repeatedly appear in the conditions, or as a subset of the conditions, of queries that are issued in a given database system. For example, referring to Table 100 in FIG. 1A, the query used in selecting "all males over the age of 35, who are married and who have five or more offspring" may be used repeatedly to obtain information relating to consumer patterns, political voting patterns, or perhaps, lifestyle and health profiles. Since the above query involves a long Boolean expression, the computation of the expression is done once for each row, and the results of the computation are stored in a row status index. Thus, the results of the computation can be used repeatedly without the expense of reevaluating the Boolean expression for each row of data every time the query is issued. It is to be noted that the query may involve non-Boolean expressions and constants.

In FIG. 1A, as the data for each row is inserted in the Table 100, it is evaluated against the search criteria of "all males over the age of 35, who are married and who have five or more offspring". The status of each row of Table 100, i.e. whether the row satisfies the search criteria in question, is represented by a corresponding bit in a bitstring.

During query processing, it is inefficient to access and use a long bitstring. Also, a long bitstring does not provide high levels of concurrency. Therefore, according to one embodiment of the invention, the bitstring is broken up into segments, and the segments are stored in an index as shall be described hereafter.

BIT-TO-ROW MAPPINGS

According to one embodiment, row status indexes are used in conjunction with tables that include a unique key column that either is a number, or that may be mapped to a unique number. In general, the values in such a column function as unique IDs for rows in the table, where the unique ID is usually of the type "integer". In such embodiments, the unique values are used to establish the mapping between rows of the table and the bits in the bitstring that correspond to the rows.

Figure 1B:
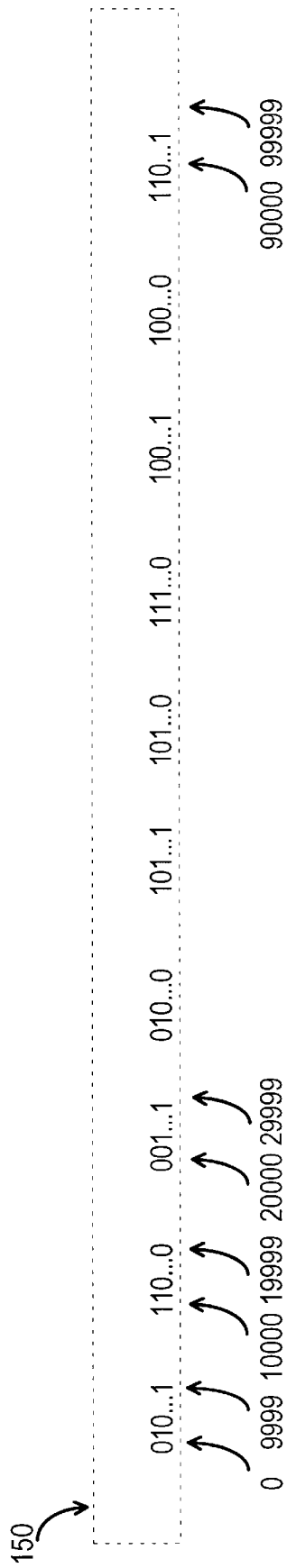
FIG. 1B illustrates a bitstring related to a single search criterion, according to an embodiment of the invention.

Specifically, a mechanism is provided for deriving the position of a bit in the bitstring, based on the unique id of the row that corresponds to the bit. Conversely, a mechanism is provided for deriving the unique id based on the position of the bit in the bitstring. To illustrate, FIG. 1B shows a bitstring 150. The position of the bits in bitstring 150 are numbered "0 ..., 9999, 10,000, ..., 19999" and so on as shown in FIG. 1B. The position of a bit in bitstring 150 is simply equal to the unique id of the row to which the bit corresponds. In FIG. 1B, the bit in position "0" in bitstring 150 corresponds to unique id "0" in column 102 in FIG. 1A. Recall that column 102 is the unique key column where the values function as unique IDs for rows in the Table 100 of FIG. 1A. Similarly, in FIG. 1B, the bit in position "29,999" in bitstring 150 corresponds to unique id "29,999" in column 102 of Table 100 in FIG. 1A. However, it is to be noted that if the values in the unique key column of Table 100 start at "100,000", for example, instead of "0", then the bit in position "0" would correspond to unique id "100,000". Similarly, the bit in position "29,999" would correspond to unique id "129,999". Thus, in general, the position of the bit in the bitstring is equal to the unique key value plus or minus some constant.

Conversely, unique id "0" in column 102 in FIG. 1A maps to the bit in position "0" in bitstring 150 of FIG. 1B. Unique id "29,999" in column 102 in FIG. 1A maps to the bit in position "29,999" in bitstring 150 of FIG. 1B. If unique id started at "100,000" instead of "0", then unique id "100,000" would map to the bit in position "0" in bitstring.

The mechanism, as explained above, for deriving the position of a bit in the bitstring, and for deriving the unique key value based on the position of the bit in the bitstring, pertains to an entire contiguous bitstring. If the bitstring is divided into segments, then the mechanism for deriving the position of a bit in the bitstring and for deriving the unique key value based on the position of the bit in the bitstring is different, as shall be described hereafter.

SEGMENTED BITSTRINGS

If Table 100 in FIG. 1A comprised several million rows of data, the bitstring 150 of FIG. 1B would then be very long. A long bitstring poses three problems. First, a long contiguous bitstring can result in inefficient storage of the bitstring. Second, it is inefficient to operate on a long bitstring. Third, a long bitstring does not provide high levels of concurrency. Thus, according to one embodiment of the invention, the bitstring is broken up into segments. Segmentation of the bitstring not only allows for more efficient storage of the bitstring, it also allows for the use of efficient retrieval mechanisms like indexes. Moreover, by breaking up a bitstring into segments, several users can operate on the bitstring at one time because each user can access a different segment of the bitstring.

Figure 2A:
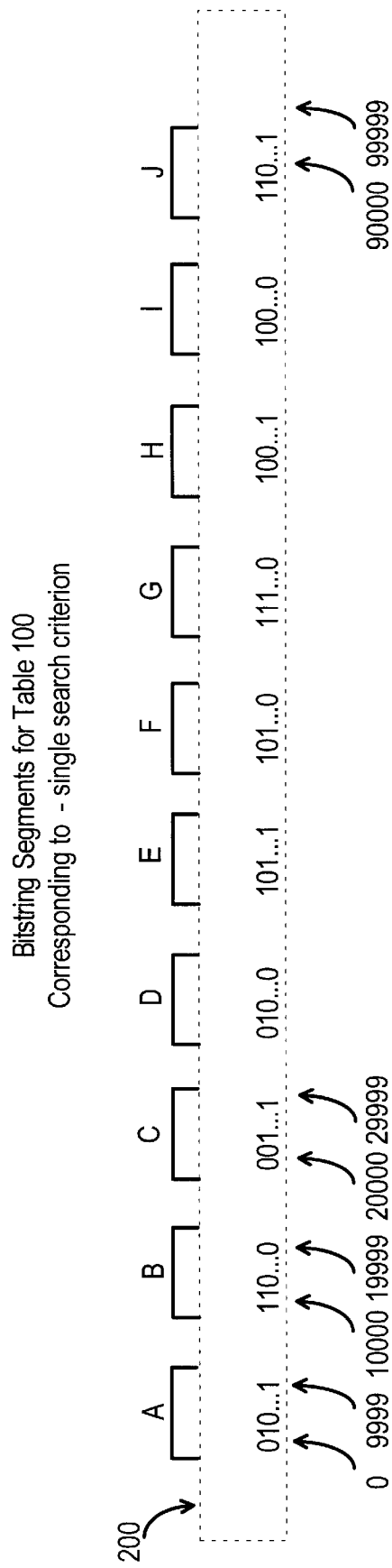
FIG. 2A illustrates a bitstring consisting of a series of segments and related to a single search criterion, according to an embodiment of the invention.

Segmentation of the bitstring allows for more efficient storage of the bitstring. FIG. 2A illustrates a bitstring 200, consisting of a series of segments A through J, for Table 100. Segment A is the zeroeth segment, Segment B is the first segment and so on. Each segment consists of a series bits. Under certain conditions, certain segments of a bitstring need not be stored at all. If, for example, there is a gap in the unique key column in Table 100, such that there are no key values in the range from 70,000 to 80,000, there need not be a segment covering that range in FIG. 2A because there are no existing rows that map to that range. Also, if all the rows within a range of key values do not satisfy the query or a predicate of the query, or if all the rows within a range of key values do satisfy the query or predicate of the query, then the segments covering that range of key values need not be stored at all. Thus, the ability to not store certain segments results in more efficient storage of the bitstring.

Segmentation of the bitstring allows for the use of efficient retrieval mechanisms like indexes. According to one embodiment of the invention, the bitstring is divided into segments and an index entry is created for each segment. The index entries are organized, as shall be described hereafter, in a manner to allow for faster access to the segments. The index is organized so that it can be efficiently traversed to find a given segment of bitstring.

A mechanism is provided for deriving the position of a segment in a bitstring, based on the unique key value (unique id) of the row that corresponds to the first bit in that segment. Also, a mechanism is provided for deriving the position of a bit within the segment of a given index entry based on unique key value of the row that corresponds to the bit and segment size. In FIG. 2A, bitstring 200 is divided into 10 equal segments, and each segment represents 10,000 bits. Thus, the "segment size" of each segment in bitstring 200 is 10,000. Each bit corresponds to a unique key value, which in turns corresponds to a row in a table for which the search criteria of a query has been pre-evaluated.

Figure 3A:
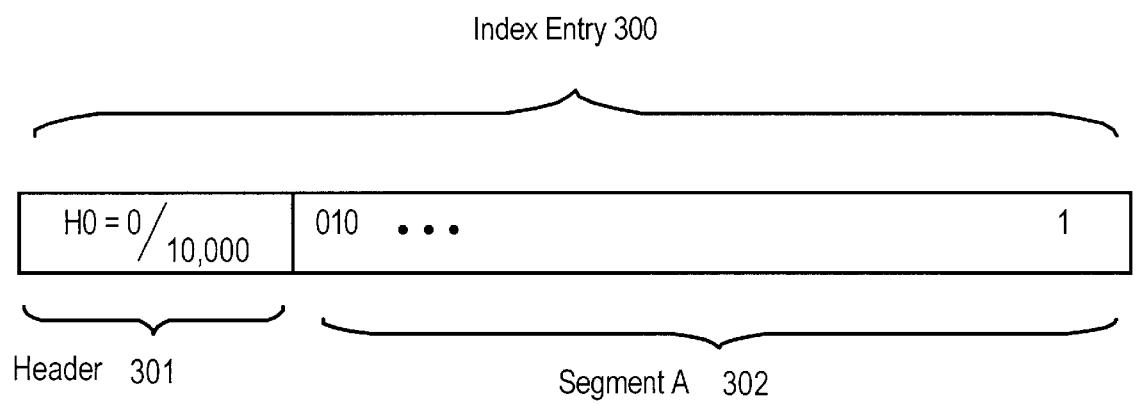
FIG. 3A illustrates an index entry related to a segment in FIG. 2A.

FIG. 3A illustrates Index Entry 300 consisting of header key 301, and segment A 302 of bitstring 200. In order to identify a segment's position in a bitstring, each segment is preceded by a header key. According to one embodiment of the invention, the header key for any given segment equals the unique key value of the row that corresponds to the first bit in the segment divided by segment size. As shall be described hereafter, the row status index can be organized in a B-tree structure built on header keys.

In FIG. 3A, header key 301, denoted by H0, equals key value <0> divided by segment size <10,000>. Key value <0> is the unique key value of the row corresponding to the first bit in Segment A 302. Thus, header key 301, denoted by H0, equals <0>. Attached to the header key is Segment A 302 composed of 10,000 bits corresponding to the rows that have unique key values ranging from 0 to 9,999.

Figure 3B:
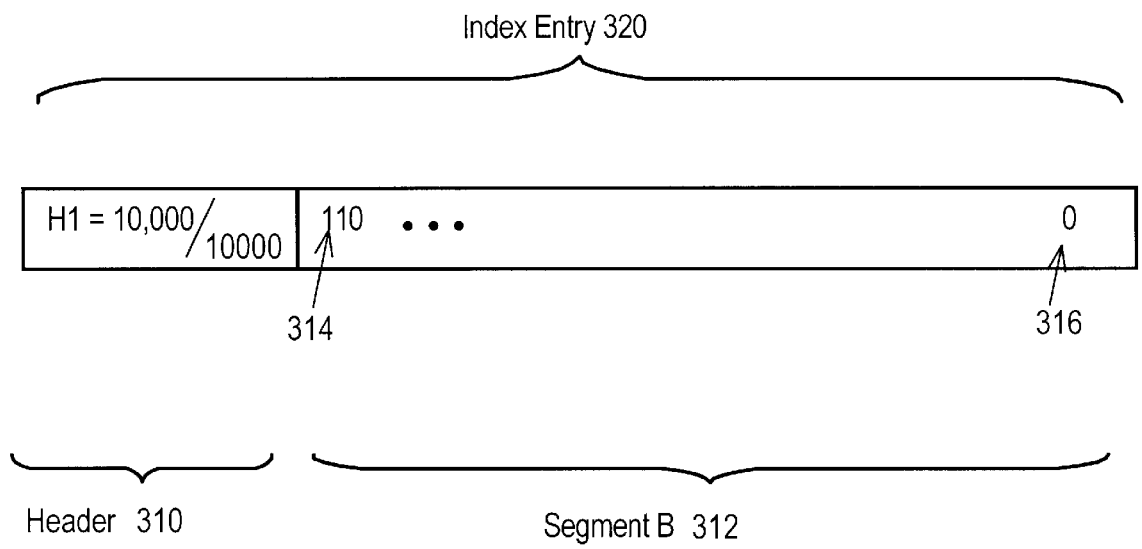
FIG. 3B illustrates an index entry related to a segment in FIG. 2A.

Similarly, FIG. 3B illustrates Index Entry 320 consisting of header key 310, and Segment B 312 of bitstring 200. Header key 310, denoted by H1, equals key value<10,000> divided by the segment size <10,000>. Key value <10,000> is the unique key value of the row corresponding to the first bit in Segment B 312. Thus header key 310, H1, equals <1>. In bitstring 200, Segment A has the header key of "0" and thus precedes Segment B that has a header key of "1". Referring to FIG. 2A, bitstring 200 has 10 header keys ranging from "0" to "9".

The segment size and the header key of a segment may be used to derive the range of the unique key values that are represented by the bits in the segment. For example, header key value of "0" and segment size "10,000", indicate that there are 10,000 bits in that segment of bitstring and that the first bit in that segment of bitstring corresponds to the row identified by the unique key value <0>, the second bit corresponds to the row identified by the unique key value <1>, and so on. The last bit in that segment of bitstring corresponds to the row identified by the unique key value <9,999>. Similarly, header key value of "1" and segment size 10,000, indicate that there are 10,000 bits in that segment of bitstring and that the first bit in that segment of bitstring corresponds to the row identified by the unique key value <10,000>, the second bit corresponds to the row identified by the unique key value <10,001>, and so on. The last bit in that segment of bitstring corresponds to the row identified by the unique key value <19,999>.

In FIG. 3B, attached to the header key 310, is Segment B 312. Key value <10,000> corresponds to bit 314 in Segment B 312. Bit 314 is the "first" bit in Segment A 312, and is set to "1". The "1" indicates that the search criteria associated with the bitstring 200 evaluates to "TRUE" with respect to the row corresponding to the unique key value <10,000>. The last bit 316 in bitstring 312 is set to "0" to indicate that the search criteria associated with bitstring 200 evaluates to "FALSE" with respect to the row corresponding to the unique key value <19,999>.

Given a particular unique key value, the formula to find the segment to which the bit corresponding to the unique key value belongs is as follows:

Segment Number=<Unique key value>DIV<segment size>

For example the bit corresponding to unique key <5,000> is in segment number 0. The bit corresponding to unique value <16,000> is in segment number 1.

$$\text{Segment number} = \langle 5{,}000 \rangle DIV \langle 10{,}000 \rangle$$

$$= 0$$

$$\text{Segment number} = \langle 16{,}000 \rangle DIV \langle 10{,}000 \rangle$$

$$= 1$$

The position, within the segment of a given index entry, of the bit that corresponds to a particular key value may be derived from the key value and the segment size as follows:
Position of the bit within the segment=<key value>modulo<segment size>. For example, if the segment size of segment B is <10,000>, and the key value is <19,000>, then Position of the bit within the segment=<19,999>modulo<10,000>

Therefore, the bit associated with the unique key value <19,999> in FIG. 3B has the position <9,999> within segment B, which is the last bit 316 in Segment B 312. Conversely, the unique key value of a bit equals the position of the bit within the segment of a given index entry plus the segment size times the header key of the segment.

Unique key value=<9,999>+<10,000>*<1>

COMPOSITE KEY VALUES

According to one embodiment, the unique key can include composite key values in the form of <column x1.column x2.column x3 . . . column p> from the base table, where column x1, column x2, . . . , column (p−1) may be any column of the data table and may consist of any data type. However, column p consists of a number. Thus, a composite key value may comprise a non-numeric prefix followed by a numeric ID number. For example, with reference to Table 100 of FIG. 1A, the unique composite key can be of the form <State.County.Citizen ID Number>, where State.County is the non-numeric prefix to the numeric Citizen ID Number. Composite key value <GA.Gwinette.9> is distinct from composite key value <CA.San Benito.9>.

In the case of composite key values and with reference to Table 100 of FIG. 1A, the header key for any given segment is of the form <column x1.Column x2.column x3 . . . [column p/segment size]> where column x1, column x2, column x3 . . . and column p are as defined above. In the case of composite keys, the numeric component of the header key of a given segment is the numeric column p component of the composite key value of the row corresponding to the first bit in the segment divided by segment size. As an example, a header key value may look like <GA.Gwinette.[20,000/10,000]> (i.e. GA.Gwinette.2) where GA.Gwinette is the non-numeric prefix of the header key and <2> is the numeric component of the header key value. <20,000> is the numeric component of the composite key value of the row corresponding to the first bit in the segment, and <10,000> is the segment size.

Just as in the case of non-composite keys, given a particular unique composite key value, the formula to find the segment to which the bit corresponding to the unique composite key value belongs is as follows:

Segment Number=<numeric column p component of composite key value>DIV <segment size>

For example, if segment size is <10,000>, then the bit corresponding to unique composite key value <GA.Gwinette.5,000> is in segment number 0. Similarly, the bit corresponding to unique composite key value <GA.Gwinette.26,000> is in segment number 2.

Segment number = ⟨5,000⟩$DIV$⟨10,000⟩

= 0

Segment number = ⟨26,000⟩$DIV$⟨10,000⟩

= 2

When composite key values are used, the position, within the segment of a given index entry, of the bit that corresponds to a particular composite key value may be derived from the numeric column p component of the composite key value and the segment size as follows:

Position of the bit within the segment = ⟨numeric column $p$ component of the composite key value⟩ modulo⟨segment size⟩.

For example, if the segment size is <10,000> and the composite key value is <GA.Gwinette.26,000>, then Position of the bit within the segment = ⟨26,000⟩modulo

⟨10,000⟩

= ⟨6,000⟩

Therefore, the bit associated with the composite key value <GA.Gwinette.26,000> has the position <6,000> within segment 2.

Conversely, the numeric column p component of the composite key value of a bit equals the position of the bit within the segment of a given index entry plus the segment size times the numeric component of the header key value.

Column p component in a composite key value=<6,000>+<10,000>*<2>

As shall be explained hereafter, the row status can be organized in a B-tree structure built on header keys.

BITSTRING SEGMENT SIZES

As explained above, with reference to FIG. 2A, bitstring 200 is divided into fixed size segments. According to one embodiment, the size of the segments is tailored to the size of a data block in a persistent storage device. In particular, it is preferable for a segment to span an entire data block, or to span a fraction of the block that allows some exact number of segments to fill a given data block. The goal is to avoid having a segment that spans multiple data blocks.

In embodiments where a segment is allowed to span multiple data blocks, each data block containing the segment would necessitate a separate disk I/O operation, since a data block is the lowest level of granularity at which data is read from a persistent storage device into dynamic memory. Further, if a segment spans multiple blocks, a mechanism is needed to identify the "next block" that contains portions of the segment, and to reconstruct the segment in dynamic memory by merging the separately stored portions thereof.

In the context of accessing data, segment size has an effect on concurrency. Higher levels of concurrency can be achieved with smaller segments of bitstrings because each database transaction only obtains a lock on the segment of bitstring that it needs. Thus, other transactions may concurrently obtain locks on and update bits that are located in other segments of the bitstring. On the other hand, larger segments allow for more condensed storage. Thus, the size of the segment is selected to fit the goals of the task at hand.

B-TREE ORGANIZED ROW STATUS INDEXES

According to one embodiment, a row status index is organized in a B-tree stricture. Recall that a purpose of header keys is to allow index entries, as described above, to be organized in an index. Each index entry includes a header key and a segment of a bitstring. The B-tree structure is built on the header keys.

Figure 4A:
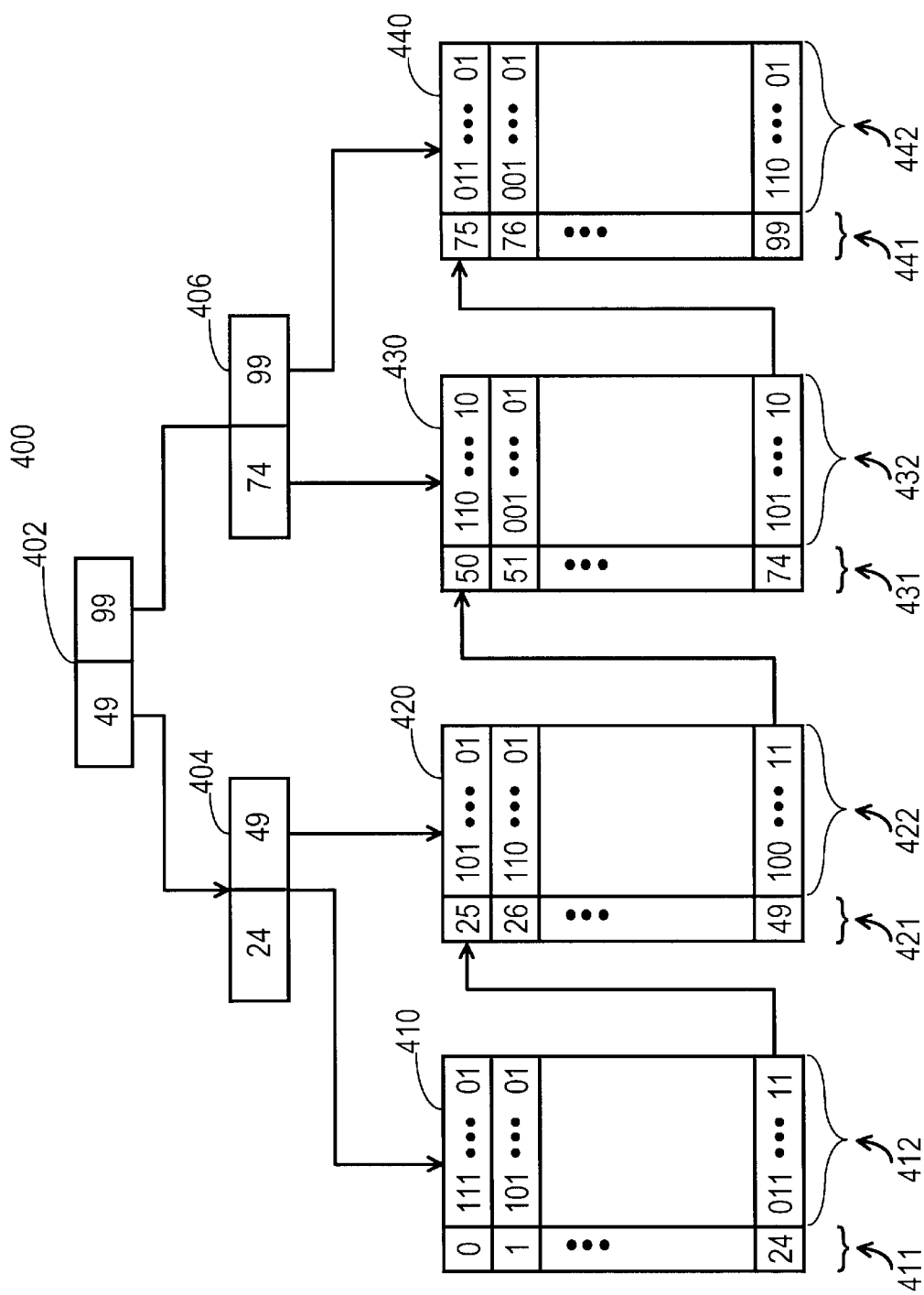
FIG. 4A depicts the logical layout of a B-tree index.

A sample B-tree's logical layout is illustrated in FIG. 4A. A B-tree index is a hierarchical arrangement of two types of nodes: leaf nodes and branch nodes. Leaf nodes reside at the lowest level of the B-tree hierarchy and contain values relating to the actual column or columns upon which the index is built. For example, B-tree 400, is built upon the header keys that are derived from the key values in column 482 of Table 480 of FIG. 4B. B-tree 400 has leaf nodes 410, 420, 430, and 440 that collectively hold the header keys ranging from 0 to 99. Specifically, leaf node 410 holds the index entries for header keys 411 ranging from 0 to 24. As explained earlier, each index entry includes a header key and a segment. Each bit of the segment maps to a corresponding unique key value from column 482 of Table 480. Specifically, the bits in leaf node 410 map to a corresponding unique key values from column 482 ranging from 0 to 249,999.

Similarly, leaf node 440 contains a header key 441 ranging from 75 to 99. The bits in leaf node 440 map to a corresponding unique key value from column 482 ranging from 750,000 to 999,999. The header key 75 multiplied by the segment size produces the key value of the row that corresponds to the first bit in the attached segment. Each leaf node contains a pointer or other link to the subsequent leaf node. For example, leaf node 410 points to leaf node 420. The non-leaf nodes of a B-tree index are branch nodes. Branch nodes contain information that indicate a range of values. In this case, the range of values is the range of header keys upon which the B-tree index is built. In the illustrated B-tree index 400, nodes 402, 404, and 406 are branch nodes and therefore correspond to a range of header keys. The range of header keys indicated by each branch node is such that all index entries that reside below a given branch node have header keys that fall within the range associated with the branch node. For example, node 406 is a branch node that corresponds to the numerical range from 50 to 99. Consequently, the index entries in nodes 430, and 440, which both reside below node 406 in the hierarchy, have header keys that fall within the range from 50 to 99.

MULTIPLE STATUSES

In the previous examples, bitstrings have been discussed in which (1) the bitstring is associated with a single search criterion (i.e. status), (2) each row in the table corresponds to a single bit in the bitstring, and (3) the bit, in the bitstring or segment of bitstring, that corresponds to a row indicates whether the row satisfies the status associated with the bitstring. According to an alternative embodiment, (1) a bitstring is associated with multiple search criteria (i.e. statuses), (2) each row in the table corresponds to a series of bits in the bitstring (one bit for each status), and (3) each bit in the series of bits that correspond to the row indicates whether the row satisfies a different one of the statuses associated with the bitstring.

For example, the search criteria consisting of the Boolean expression: "all males AND who are over the age of 35, AND who are married AND who have more than five offspring, AND who have blonde hair" can be broken up into five separate statuses. The above search criteria can be broken into the following five search criteria: 1) All males; 2) all persons over age 35; 3) all persons who are married; 4) all persons who have more than five offspring, 5) all persons who have blonde hair. Each of the five search criteria is computed for each row of data, resulting in five status values per row. Each status is represented by one bit. Consequently, each unique key value is associated with five bits in a segment of a bitstring.

Figure 2B:
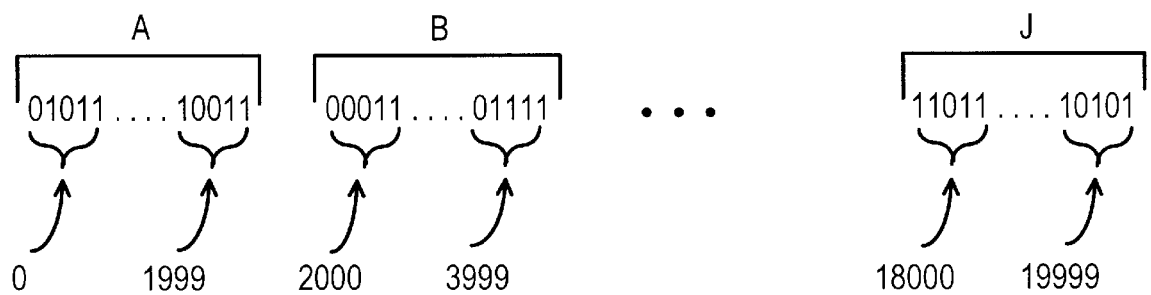
FIG. 2B illustrates a bitstring consisting of a series of segments and relating to 5 search criteria, according to an embodiment of the invention.

For example, FIG. 2B illustrates segments of a bitstring in which every five consecutive bits is associated with a unique key value. For example, key value <1999> is associated with 5 bits, namely, <10011>. Thus, the row identified by key value <1999> satisfies statuses 1,4 and 5 but not statuses 2 and 3. This means that the individual identified by Citizen ID number <1999> is male, has more than five offspring, and has blonde hair but is not over the age of 35 and is not married.

In the case of multiple statuses, the header key of the index entry that holds the status bits for a row with a given unique key value is equal to <unique key value> divided by <segment size divided by the number of statuses>.

Header key of the index entry =<unique key value>/ (<segment size>/<number of statuses>)

Figure 3C:
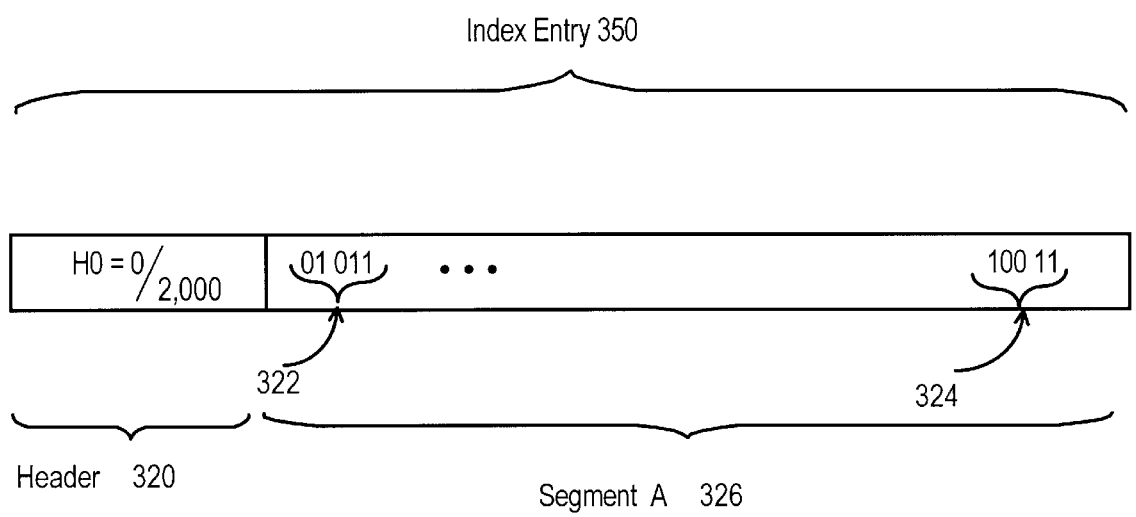
FIG. 3C illustrates an index entry related to a segment in FIG. 2B.

For example, in FIG. 2B, segment A consists of 10,000 bits. Thus, as seen in FIG. 3C, header key 320, denoted by H0, is key value zero divided by 2000. Segment A, as shown in FIG. 2B, contains bits related to 2000 unique key values. For example in FIG. 3C, key value <0> is the unique key value of the row corresponding to the first set of 5 bits 322 in Segment A 326. Key value <2000> corresponds to the last set of 5 bits 324 in Segment A 326.

Similarly, in the case of composite key values with multiple statuses, the numeric component of composite header key of the index entry that holds the status bits for a row with a given composite key value is equal to <the numeric component of unique the composite key value> divided by <segment size divided by the number of statuses>.

The numeric component of Composite Header key of the index entry=<the numeric component of the unique composite key value>/(<segment size>/<number of statuses>) For example, a composite header key may look like <GA.Gwinette.[20,000/2000]>.

$$\text{Composite Header key of the index entry} = \langle GA \cdot Gwinette \cdot$$

$$20{,}000 \rangle /$$

$$(10{,}000/5)$$

$$= \langle GA \cdot Gwinette \cdot$$

$$[20{,}000/2000] \rangle$$

where <GA.Gwinette> is the non-numeric prefix to the unique composite key value, <20,000> is the numeric component of unique composite key value, <10,000> is the segment size, and <5> is the number of statuses.

The formula for deriving the status number of a particular bit within a segment is as follows:

Status number=<position of the bit in the segment>modulo<number of statuses>+1

For example, assume there are 5 statuses, then the zeroeth bit in the segment corresponds to status number 1. Similarly the $4^{th}$ bit in the segment corresponds to status number 5. The $5^{th}$ bit in the segment corresponds to status number 1

$$\text{Status number} = \langle 0 \rangle \text{modulo} \langle 5 \rangle + 1$$

$$= 1$$

$$\text{Status number} = \langle 4 \rangle \text{modulo} \langle 5 \rangle + 1$$

$$= 5$$

$$\text{Status number} = \langle 5 \rangle \text{modulo} \langle 5 \rangle + 1$$

$$= 1$$

The formula for deriving the unique key value for a row from the position of a bit within a segment is as follows:

> Unique key value=<header key of the segment>*<segment size/number of segments>+DIV<position of bit in the segment/number of statuses>

In the case of composite keys, the formula for deriving the unique composite key value for a row from the position of a bit within a segment is as follows:

The numeric component of a unique composite key value=<the numeric component of the composite header key of the segment>*<segment size/number of segments>+DIV<position of bit in the segment/number of statuses>

The advantage of having multiple separate statuses associated with each unique key value is increased flexibility of the database system. For example, the same status index may be used to process a SQL statement selecting all males with blonde hair and another SQL statement selecting all persons who are married, are blonde, and have more than five offspring.

HASH TABLE ORGANIZATION

An index built on the status of rows can be organized in a hash table. Generally, hash tables store data based on hash keys. A hash key is one or more columns from one or more tables. Instead of using other types of indexes to find data, a hash key is used to place and locate data on the disk. The hash keys are used as input to a hashing function. The output of the hashing function is a hash value that corresponds to a hash bucket in the hash table. The bucket that corresponds to a hash value is used to store the index entries whose hash keys hash to the hash value.

Figure 4B:
FIG. 4B illustrates a table containing 1,000,000 rows of data.

According to one embodiment, each unique ID from column 482 of FIG. 4B is used as a hash key that is applied as input to a hash function. The output of such an operation is a hash value that maps to a hash bucket in a hash table. Stored within the hash bucket is an entry comprising of the unique ID that was used as input for the hash function and the bit that corresponds to the row that has the unique ID that was used as input for the hash function. There are numerous well-known techniques for implementing hash tables and resolving collisions that occur in hash tables. The present invention is not limited to any one of those techniques.

An example of a hash function that could be used is the function described above with respect to determining the header key for an index entry. Specifically, DIV<segment size> can be used a hash function. The hash value for a given hash key is computed as follows:

> Hash value=<unique key value>DIV<segment size>

For example, if unique key value <9,999> is used as the hash key, then the corresponding hash value is <0>. Similarly, if unique key value <10,002> is used as the hash key, then the corresponding hash value is <1>.

$$Hash\ value = \langle 9,999 \rangle DIV \langle 10,000 \rangle$$

$$= \langle 0 \rangle$$

$$Hash\ value = \langle 10,002 \rangle DIV \langle 10,000 \rangle$$

$$= \langle 1 \rangle$$

Figure 5A:
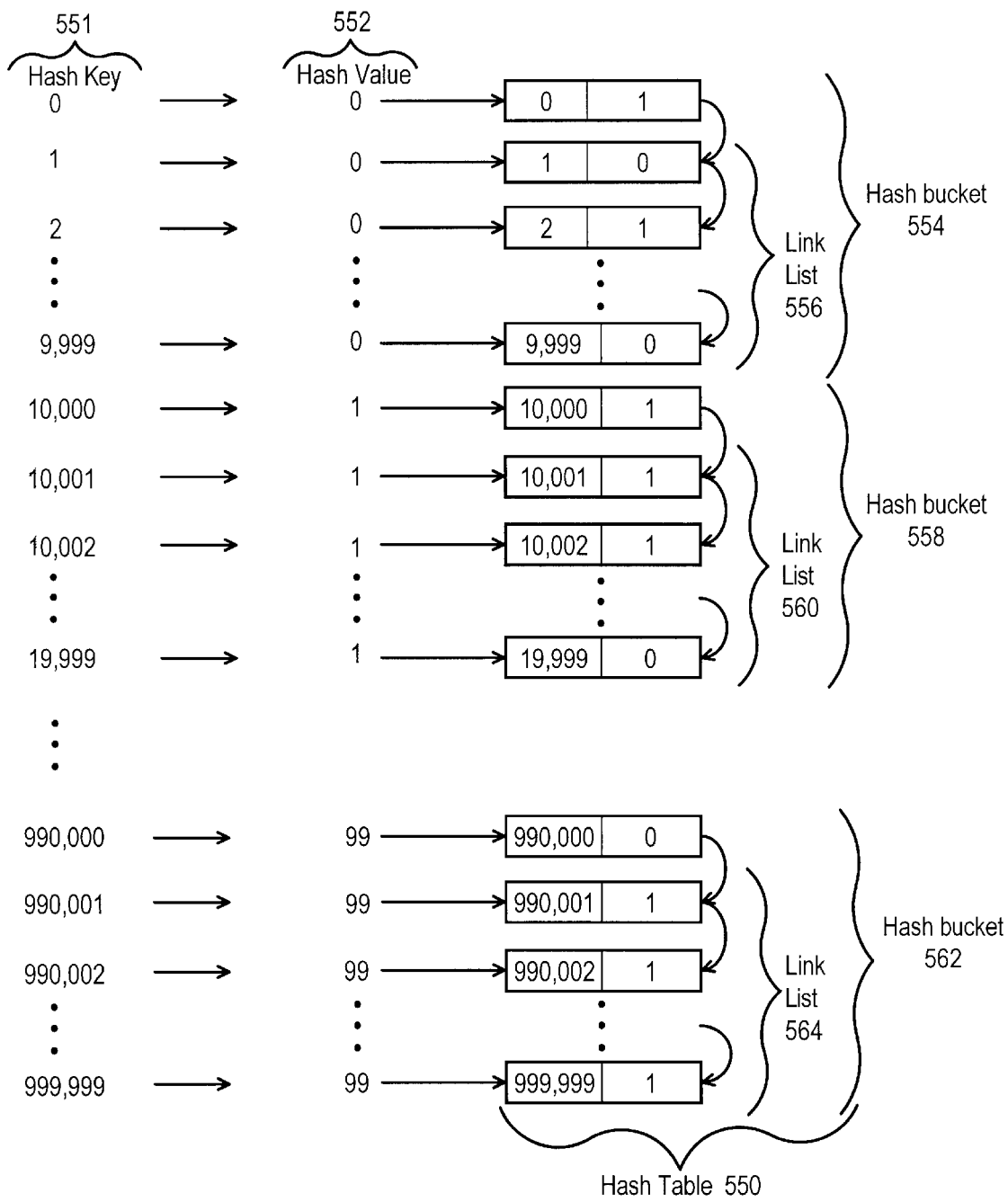
FIG. 5A illustrates a hash table.

In FIG. 5A, hash keys 551 range from 0 to 999,999. Hash values 552 range from 0 to 99. As an example, the bit corresponding to the row having the unique key value <9,999> is stored in hash bucket 554 because hash value <0> maps to hash bucket 554. Note that the unique key values in the range 0 to 9,999 have the same hash value of <0>. Thus, there are 10,000 collisions for hash bucket 554. Similarly, the unique key values in the range 10,000 to 19,999 have the same hash value of <1>. To resolve the collisions, each hash bucket in FIG. 5A has a link list. For example, hash bucket 554 has a link list 556 used to link the entries that correspond to the hash value <0>. Similarly, hash bucket 558 has a link list 560 used to link the entries that correspond to the hash value <1>. Hash bucket 562 has a link list 564 used to link the entries that correspond to the hash value <99>

According to the embodiment, instead of storing individual bits in each entry in the hash table, the index entries that were described with reference to FIG. 3A and FIG. 3B can be stored as the hash table entries in the hash table. Because the header key of an index entry is unique, there are no collisions because each hash bucket would contain the segment of a single index entry. The header key of an index entry is the hash value used to point to a hash bucket for storing the segment of the index entry. For example, the header key H0 of FIG. 3A has the value <0>. Hash value <0> maps to a hash bucket 510 in the hash table 500 in FIG. 5B. The hash bucket 510 would contain segment 302 of index entry 300 of FIG. 3A. Recall that segment 302 has 10,000 bits. Each bit of segment 302 corresponds to the set of unique key values from column 482 of Table 480, ranging from 0 to 9,999.

Figure 5B:
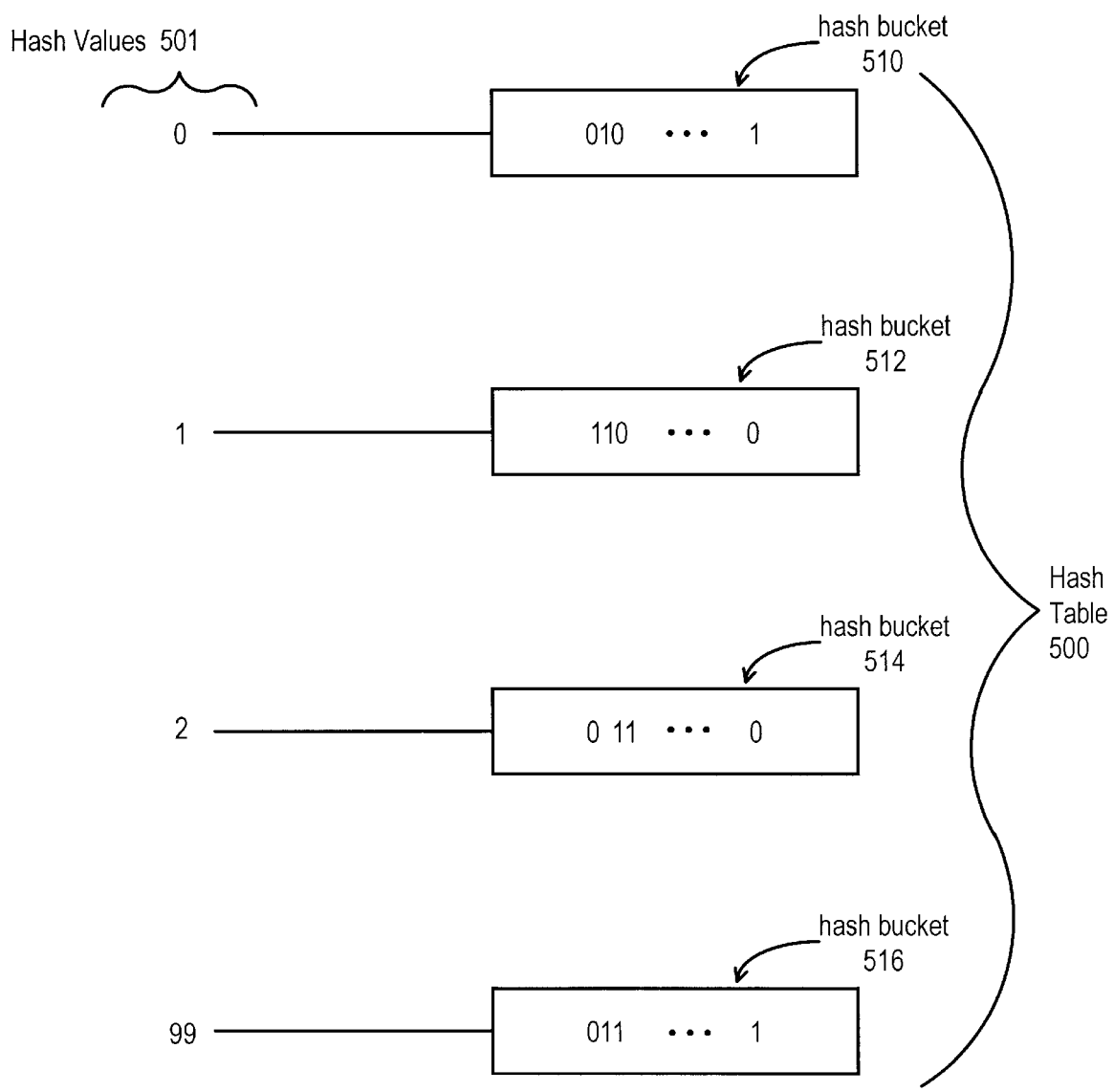
FIG. 5B illustrates an alternate embodiment of a hash table.

FIG. 5B shows hash values 501 ranging from 0 to 99. As an example, hash value <1> maps to hash bucket 512 that holds segment 312 of index entry 320 of FIG. 3B. Segment 312 of FIG. 3B contains bits that correspond to rows identified by Citizen ID numbers ranging from 10,000 to 19,999. Thus, hash bucket 512 holds the segment where each bit of the segment maps to a corresponding unique key value from column 482 of Table 480, ranging from 10,000 to 19,999. Similarly, hash value <2> maps to hash bucket 514 that holds the segment where each bit of the segment maps to a corresponding unique key value from column 482, ranging from 20,000 to 29,999. Lastly, hash value <99> maps to hash bucket 516. Hash bucket 516 holds the segment where each bit of the segment maps to a corresponding unique key value from column 482, ranging from 990,000 to 999,999.

According to one embodiment, even when a row-status index that may be used to process a query exists, it is left to the database optimizer to determine the most efficient way to execute the query. There may be occasions when the database optimizer decides that it is more efficient to perform a "full table scan" by fetching every row of the base table and examining every column referenced in the query.

HARDWARE OVERVIEW

Figure 6:
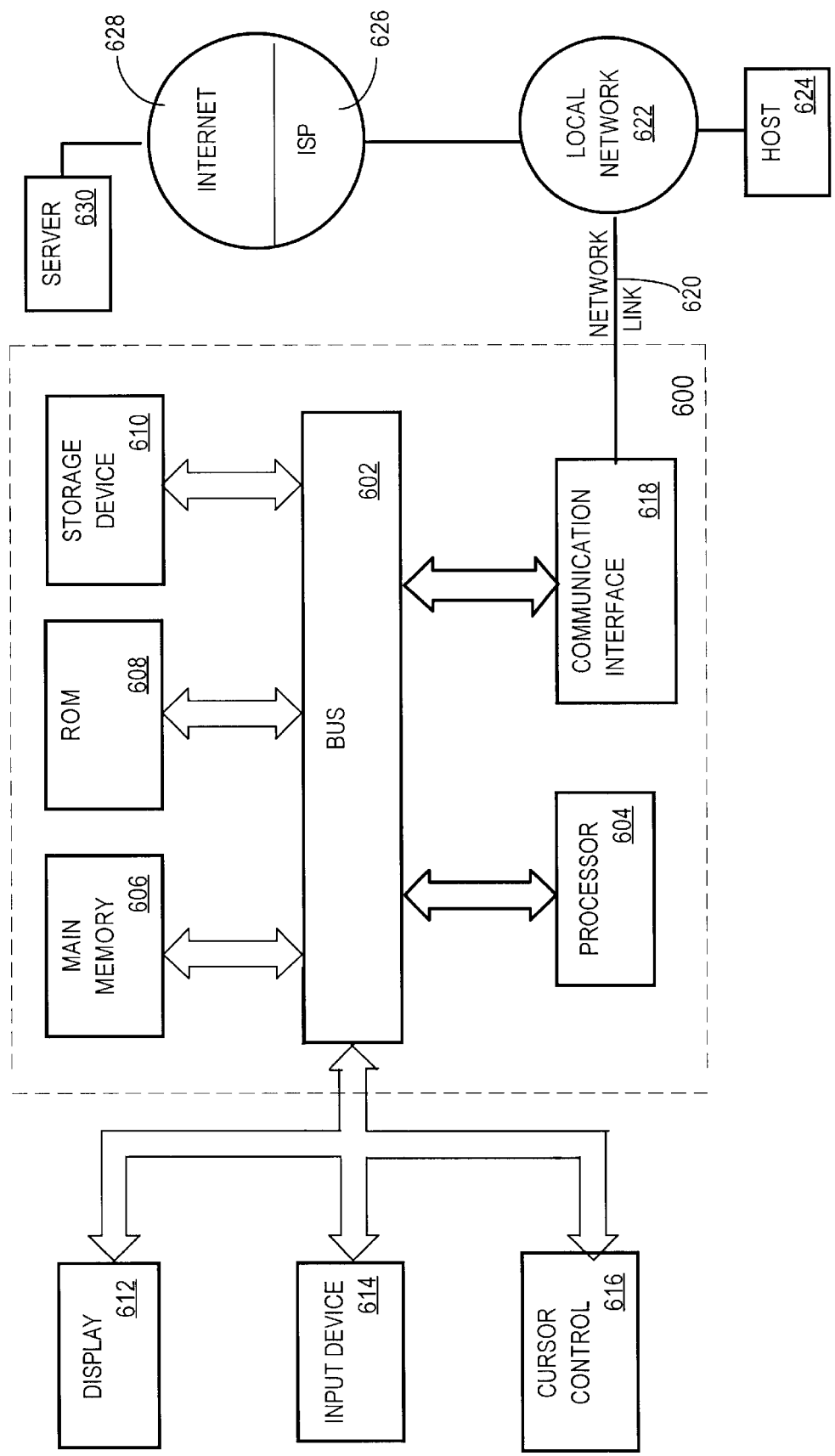
FIG. 6 depicts a computer system that can be used to implement the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for retrieving data. According to one embodiment of the invention, retrieving data is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for retrieving data as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating one or more indexes for use in processing a query, the method comprising the steps of:

determining whether each row in a table satisfies a search criterion, wherein the search criterion involves a Boolean expression that includes at least one operator that is not equality;

generating a bitstring corresponding to the rows of the table, wherein bits of the bitstring indicate whether their corresponding rows in the table satisfy the search criterion; and storing the bitstring as at least a portion of an index for use in processing subsequent queries that access the table.

2. The method of claim 1 wherein the Boolean expression that includes at least one operator that is not equality involves one or more relational operators from the set consisting of "greater than", "less than", "equal to", "greater than or equal to", "less than or equal to".

3. The method of claim 1 wherein the search criterion further involves values from more than one column of each row.

4. The method of claim 1 further comprising the steps of:
   detecting updates to one or more columns of the table that are referenced in the search criterion;
   in response to the updates, updating the bits in the bitstring corresponding to the updated rows if the updates cause the updated rows to change status with respect to satisfying the search criterion; and
   in response to the updates, not updating the bits in the bitstring corresponding to the updated rows if the updates do not cause the updated rows to change status with respect to satisfying the search criterion.

5. The method of claim 1 wherein the step of storing the bitstring corresponding to the rows of the table further comprises the steps of:
   dividing the bitstring into segments;
   selecting a size for the segment such that the segment does not span more than a block of data, wherein the block of data is the smallest quantity of data that can be read from a persistent store;
   providing a mechanism for determining the segment to which a bit corresponding to a given row in the table maps; and
   providing a mechanism for determining the position, within the segment, of the bit corresponding to a given row in the table.

6. The method of claim 1 wherein:
   each bit of the bitstring is mapped to a unique key value which, in turn, maps to a row in the table; and
   the unique key value includes values from one or more columns of the table.

7. The method of claim 1 wherein:
   unique key values are associated with rows of the table; and
   the step of storing the bitstring corresponding to the rows of the table further comprises the step of not storing the segments of bitstring corresponding to gaps in a range of unique key values associated with the rows of the table.

8. The method of claim 1 wherein:
   unique key values are associated with rows of the table; and
   the step of storing the bitstring corresponding to the rows of the table further comprises the step of not storing segments of bitstring corresponding to a range of unique key values for which the status of the rows associated with the range of unique key values have a particular value.

9. The method of claim 1 further comprising the step of:
   dividing the bitstring into segments; and
   storing the segments in index entries within a B-tree index.

10. The method of claim 1 further comprising the steps of:
    dividing the bitstring into segments; and
    organizing the segments in a hash table.

11. The method of claim 1 further comprising the steps of:
    determining whether each row in the table satisfies one or more additional search criteria, wherein each of the one or more additional search criteria involves a Boolean expression; and
    the bitstring includes bits which indicate whether the rows that correspond to the bits satisfy the one or more additional search criteria.

12. A computer-readable medium carrying one or more sequences of instructions for generating one or more indexes for use in processing a query, wherein execution of the one or more sequences of instructions by one or more processors causes the one or more processors to perform the steps of:
    determining whether each row in a table satisfies a search criterion, wherein the search criterion involves a Boolean expression that includes at least one operator that is not equality;
    generating a bitstring corresponding to the rows of the table, wherein bits of the bitstring indicate whether their corresponding rows in the table satisfy the search criterion; and
    storing the bitstring as at least a portion of an index for use in processing subsequent queries that access the table.

13. The computer-readable medium of claim 12 wherein the Boolean expression that includes at least one operator that is not equality involves one or more relational operators from the set consisting of "greater than", "less than", "equal to", "greater than or equal to", "less than or equal to".

14. The computer-readable medium of claim 12 wherein the search criterion further involves values from more than one column of each row.

15. The computer-readable medium of claim 12 further comprising the steps of:
    detecting updates to one or more columns of the table that are referenced in the search criterion;
    in response to the updates, updating the bits in the bitstring corresponding to the updated rows if the updates cause the updated rows to change status with respect to satisfying the search criterion; and
    in response to the updates, not updating the bits in the bitstring corresponding to the updated rows if the updates do not cause the updated rows to change status with respect to satisfying the search criterion.

16. The computer-readable medium of claim 12 wherein the step of storing the bitstring corresponding to the rows of the table further comprises the steps of:
    dividing the bitstring into segments;
    selecting a size for the segment such that the segment does not span more than a block of data, wherein the block of data is the smallest quantity of data that can be read from a persistent store;
    providing a mechanism for determining the segment to which a bit corresponding to a given row in the table maps; and
    providing a mechanism for determining the position, within the segment, of the bit corresponding to a given row in the table.

17. The computer-readable medium of claim 12 wherein:
    each bit of the bitstring is mapped to a unique key value which, in turn, maps to a row in the table; and
    the unique key value includes values from one or more columns of the table.

18. The computer-readable medium of claim 12 wherein:
    unique key values are associated with rows of the table; and
    the step of storing the bitstring corresponding to the rows of the table further comprises the step of not storing the segments of bitstring corresponding to gaps in a range of unique key values associated with the rows of the table.

19. The computer-readable medium of claim 12 wherein:

unique key values are associated with rows of the table; and the step of storing the bitstring corresponding to the rows of the table further comprises the step of not storing segments of bitstring corresponding to a range of unique key values for which the status of the rows associated with the range of unique key values have a predetermined value.

20. The computer-readable medium of claim 12 further comprising the step of:

dividing the bitstring into segments; and storing the segments in index entries within a B-tree index.

21. The computer-readable medium of claim 12 further comprising the steps of:

dividing the bitstring into segments; and organizing the segments in a hash table.

22. The computer-readable medium of claim 12 further comprising the steps of:

determining whether each row in the table satisfies one or more additional search criteria, wherein each of the one or more additional search criteria involves a Boolean expression; and the bitstring includes bits which indicate whether the rows that correspond to the bits satisfy the one or more additional search criteria.

23. A method for generating one or more indexes for use in processing a query, the method comprising the steps of:

determining whether each row in a table satisfies a search criterion, wherein the search criterion involves a Boolean expression, wherein evaluation of the Boolean expression requires data from one or more tables other than said table;

generating a bitstring corresponding to the rows of the table, wherein bits of the bitstring indicate whether their corresponding rows in the table satisfy the search criterion; and storing the bitstring as at least a portion of an index for use in processing subsequent queries that access the table.

24. The method of claim 23 wherein evaluation of the Boolean expression requires a join between said table and said one or more tables.

25. A computer-readable medium carrying one or more sequences of one or more instructions for generating one or more indexes for use in processing a query, the one or more sequences of one or more instructions including instructions which, when executed by one or more processors, cause the one or more processors to perform the steps of:

determining whether each row in a table satisfies a search criterion, wherein the search criterion involves a Boolean expression, wherein evaluation of the Boolean expression requires data from one or more tables other than said table;

generating a bitstring corresponding to the rows of the table, wherein bits of the bitstring indicate whether their corresponding rows in the table satisfy the search criterion; and storing the bitstring as at least a portion of an index for use in processing subsequent queries that access the table.

26. The computer-readable medium of claim 25, wherein evaluation of the Boolean expression requires a join between said table and said one or more tables.

* * * * *